(12) United States Patent
Lonsberry

(10) Patent No.: US 6,177,210 B1
(45) Date of Patent: Jan. 23, 2001

(54) SEPARATOR FOR ELECTROCHEMICAL CELL AND METHOD OF ASSEMBLY

(75) Inventor: Glenn R. Lonsberry, Avon Lake, OH (US)

(73) Assignee: Eveready Battery Company, Inc., St. Louis, MO (US)

( * ) Notice: Under 35 U.S.C. 154(b), the term of this patent shall be extended for 0 days.

(21) Appl. No.: 09/314,907

(22) Filed: May 20, 1999

(51) Int. Cl.[7] ........................................ H01M 2/18
(52) U.S. Cl. ................................ 429/133; 429/140
(58) Field of Search .................... 429/131, 132, 429/133, 130, 135, 138, 140, 143, 146

(56) References Cited

U.S. PATENT DOCUMENTS

| | | | |
|---|---|---|---|
| 2,287,114 | * 10/1942 | McEachron | 429/133 |
| 4,074,023 | * 2/1978 | Urry | 429/86 |
| 4,220,693 | 9/1980 | De Palma et al. | 429/133 |
| 4,618,546 | * 10/1986 | Simonton et al. | 429/133 |
| 5,270,128 | 12/1993 | Reichert et al. | 429/29 |

* cited by examiner

Primary Examiner—Stephen Kalafut
Assistant Examiner—Monique Wills
(74) Attorney, Agent, or Firm—Robert W. Welsh; Stewart A. Fraser

(57) ABSTRACT

A cup-shaped separator and method of assembly for an electrochemical cell for separating a positive electrode from a negative electrode. The separator comprises a sheet of non-conductive separator material have a bottom section and a side wall section. The separator sheet has a plurality of tabs formed in the bottom section. The separator sheet is rolled and the plurality of tabs are folded inward to form a closed bottom surface of the cup-shaped separator.

35 Claims, 5 Drawing Sheets

SEPARATOR FOR ELECTROCHEMICAL CELL AND METHOD OF ASSEMBLY

BACKGROUND OF THE INVENTION

The present invention generally relates to electrochemical cells, i.e., batteries, and, more particularly, to a separator and method of assembly of a separator in an electrochemical cell.

Conventional alkaline electrochemical cells generally include a steel cylindrical can having a positive electrode, referred to as the cathode, which comprises manganese dioxide as the active material. The electrochemical cell also includes a negative electrode, referred to as the anode, which comprises zinc powder as the active material. The cathode is typically formed against the interior surface of the steel can, while the anode is generally centrally disposed in a cylindrical cavity formed in the center of the cathode. A separator is located between the anode and the cathode, and an alkaline electrolyte solution simultaneously contacts the anode, the cathode, and the separator. A conductive current collector is commonly inserted into the anode active material, and a seal assembly, which includes a polymeric seal, provides closure to the open end of the steel can to seal the active electrochemical materials in the sealed volume of the can.

The separator is commonly provided as an ion permeable, non-woven fabric which separates the anode from the cathode. Accordingly, the separator maintains a physical separation of the positive electrode material and the negative electrode material while allowing the transport of ions between the electrode materials. Examples of conventional separator materials include cellophane, nylon, rayon, polyvinyl alcohol (PVA) and cellulose. Separators are usually formed either by preforming the separator material into a cup-shaped basket that is subsequently inserted into the cathode during cell assembly or forming a basket during cell assembly by inserting into the cathode cavity two rectangular sheets of separator material angularly rotated ninety degrees relative to each other. The two sheets are forced into the cylindrical cavity inside the cathode and substantially conform to the cylindrical cavity.

The conventional preformed separator is typically made up of a sheet of non-woven fabric rolled into a cylindrical shape that conforms to the inside wall of the cathode and has a closed bottom end. The closed end is formed by attaching a dielectric material to the bottom end of the separator, such as using a thermoformed hot melt material according to one approach. According to another approach, the closed end is provided by inserting a polymeric seal in the form of a plug in the bottom end of the steel can and inserting the cylindrical separator up against the plug. Yet, another approach includes physically deforming the bottom end of the cylindrical separator by crushing the material at the bottom end into a wad and inserting the separator into the cathode such that the wad forms the closed bottom end.

Many conventional separators do not minimize the amount of material that is disposed in the cell, which can result in reduced volume available for electrochemically active materials. Some conventional separators are susceptible to leaving exposed openings in the separator that may allow for anode-to-cathode contact or anode-to can contact, which prematurely discharges the cell. Further, the preformed separators discussed above require a separate assembly, and therefore require rehandling of the separators which adds to the cost and are susceptible to damage during handling. Accordingly, it is therefore desirable to provide for a separator for use in electrochemical cells that efficiently separates the positive and negative electrodes.

SUMMARY OF THE INVENTION

The present invention improves the separation of the electrodes in an electrochemical cell with an enhanced separator and method for assembly. To achieve this and other advantages, and in accordance with the purpose of the invention as embodied and described herein, the present invention provides for a cup-shaped separator for use in an electrochemical cell for separating a positive electrode from a negative electrode. The separator comprises a sheet of separator material having a bottom section and a side wall section. The separator sheet has a plurality of tabs formed in the bottom section. The separator sheet is rolled and the plurality of tabs are folded inward to form a closed bottom surface of the cup-shaped separator.

According to another aspect of the present invention, a method of assembling an electrochemical cell is provided including the steps of providing a container having a bottom end and a top end and upstanding walls disposed therebetween, and disposing positive and negative electrodes in the container. According to the method, a sheet of separator material is provided and a plurality of tabs are formed along an edge of the sheet of separator material. The sheet of separator material is rolled into a cylinder and the plurality of tabs are folded radially inward to form a closed bottom end of the separator. The separator is disposed in an electrochemical cell between the positive and negative electrodes.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
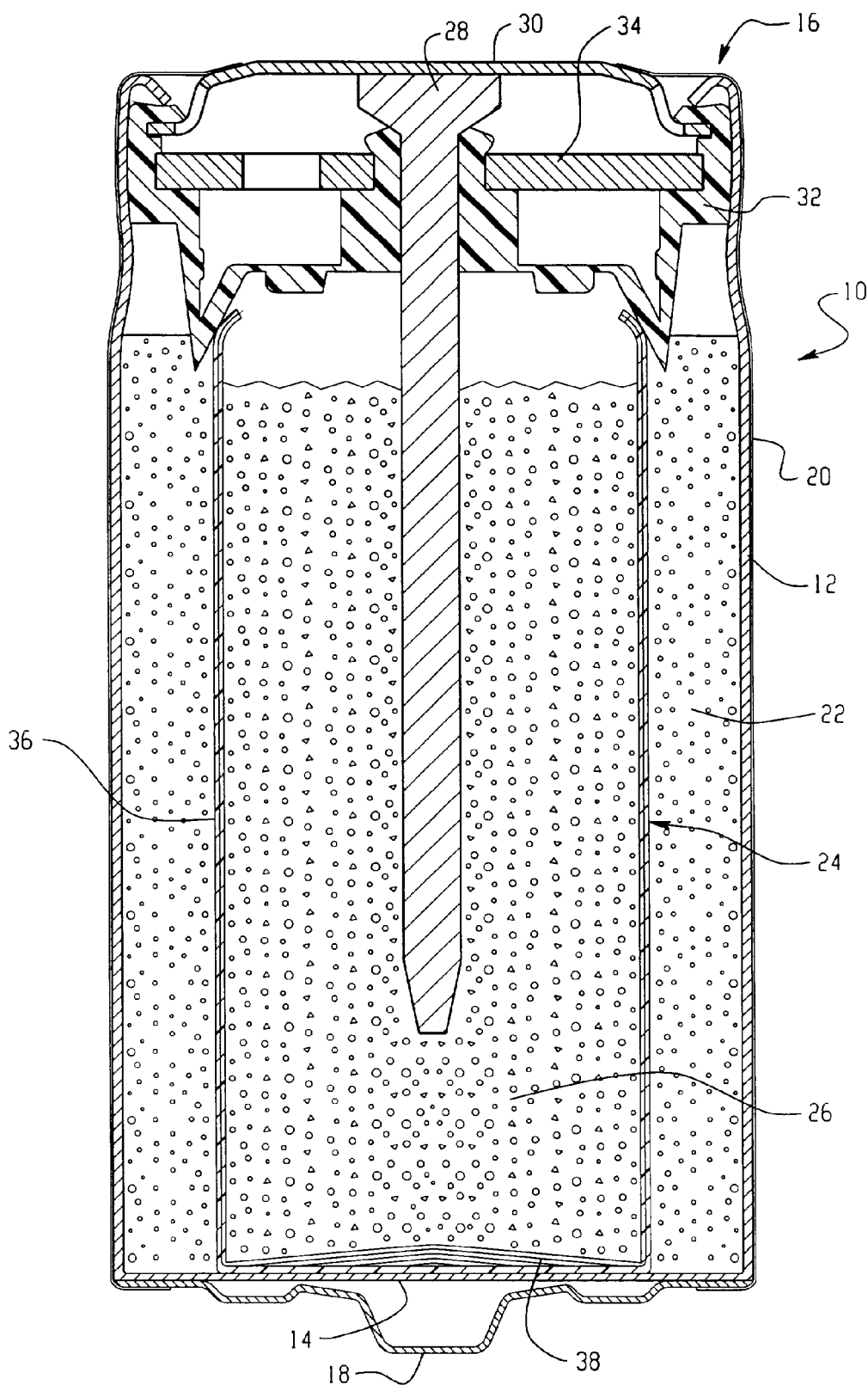
FIG. 1 is a longitudinal cross-sectional view of an electrochemical cell employing a separator according to the present invention.

Referring to FIG. 1, a cylindrical alkaline electrochemical cell 10 is shown therein. Electrochemical cell 10 includes a cylindrical steel can 12 having a closed bottom end 14 and an open top end 16. The closed bottom end of can 12 further includes a positive cover welded or otherwise attached thereto and formed of plated steel, with a protruding nub 18 at its center region, which forms the positive contact terminal of cell 10. Assembled to the open top end 16 of steel can 12 is a cover and seal assembly with an outer negative cover 30 which forms the negative contact terminal of cell 10. A metalized, plastic film label 20 is formed about the exterior surface of steel can 12, except for the ends of steel can 12. Film label 20 is formed over the peripheral edge of the positive cover and may extend partially onto the negative cover as shown.

A cathode, preferably formed of a mixture of manganese dioxide, graphite, potassium hydroxide solution, and additives, is formed about the interior surface of steel can 12. A separator 24 is disposed about the interior surface of the cathode 22. An anode 26, preferably formed of zinc powder, a gelling agent, and additives, is disposed with an electrolyte inside the separator 24 and in contact with a current collector 28 which may include a conductive nail having an elongated body and an enlarged head at one end. Accordingly, the cathode 22 is configured as the cell's positive electrode and the anode 26 is configured as the cell's negative electrode.

The current collector 28 contacts the outer negative cover 30 which forms the negative contact terminal of cell 10. The outer negative cover 30 is preferably formed of plated steel, and may be held in contact with current collector 28 via pressure contact or a weld. An annular nylon seal 32 is disposed in the open end of steel can 12 to prevent leakage of the electrochemically active cell materials contained in steel can 12. An inner cover, which is preferably formed of a rigid metal, is provided to increase the rigidity and support the radial compression of nylon seal 32, thereby improving the sealing effectiveness. The inner cover 34 is configured to contact the central hub and peripheral upstanding wall of seal 32. Together, the current collector 28, nylon seal 32, and inner cover 34 form a collector and seal assembly that can be inserted as a unit into the open end 16 of steel can 12 to seal the active ingredients within the active cell volume. It should be appreciated that the outer negative cover 30 is electrically insulated from steel can 12 by way of nylon seal 32.

According to the present invention, the electrochemical cell 10 employs a separator 24 having a cylindrical side wall 36 and a closed bottom end formed by a plurality of folded tabs 38 that are bent radially inward to form the closed bottom end. The separator 24 is formed as described herein from a sheet of non-woven material that is preferably double wrapped to form a double layered wall. The separator material may include well known electrode separator materials such as cellophane, nylon, rayon, polyvinyl alcohol (PVA), and cellulose, as well as other suitable ion permeable materials and combinations of suitable materials, such as multiple layer laminates. Examples of suitable separator materials are disclosed in U.S. Pat. No. 5,270,128. An example of a suitable laminate separator material made of grafted polypropylene thermally adhered to a synthetic electrolyte absorbent is disclosed in U.S. Pat. No. 4,220,693. The aforementioned U.S. patents are hereby incorporated by reference. The separator 24 provides physical separation between the cathode 22 and anode 26, while allowing the permeation and transport of ions between the positive and negative electrodes, i.e., cathode 22 and anode 26. In addition, the separator 24 electrically isolates the anode 26 from the bottom of can 12.

The tabs 38 forming the closed bottom end of separator 24 are folded radially inward, orthogonal to the cylindrical side wall 36 so that adjacent tabs overlap to prevent the presence of holes in the closed bottom surface. The separator 24 preferably has an odd number of tabs 38 in the range of nine to seventeen that fold inward through a complete 720 degree angle of rotation. The greater the number of tabs 38, the better the separator 24 is able to conform to the cylindrical cavity in cathode 22; however, too many tabs may complicate the separator assembly and make it difficult to prevent the presence of openings. While nine tabs 38 are shown herein for a 720 degree rotation, and nine to seventeen tabs are preferred, it should be appreciated that other numbers, shapes and sizes of tabs 38 may be employed without departing from the teachings of the present invention.

Figure 2:
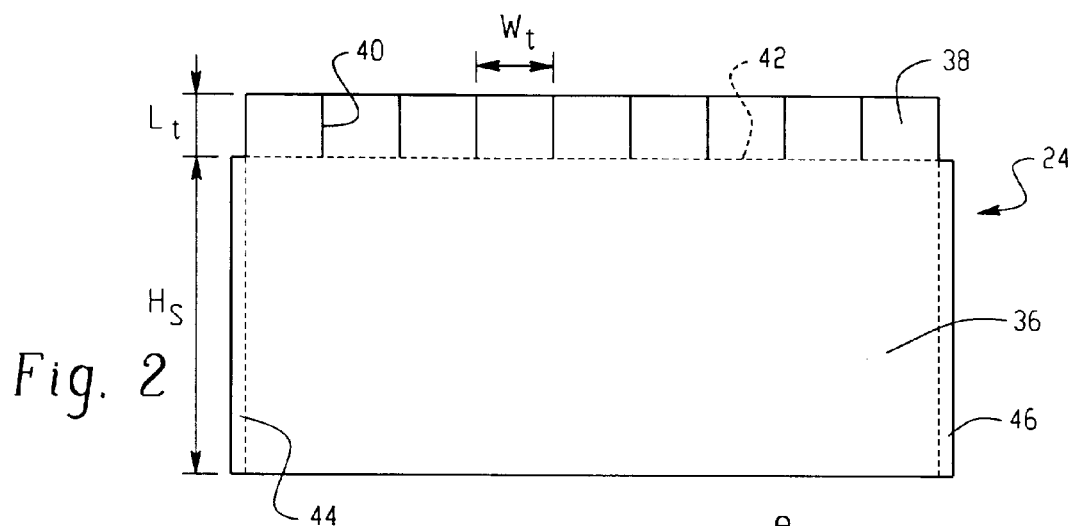
FIG. 2 is a perspective view of a sheet of separator material formed with tabs for forming a cup-shaped separator according to one embodiment of the present invention.

According to one embodiment, separator 24 is formed from a sheet of separator material with rectangular tabs 38 as shown in FIG. 2. Separator 24 is formed by cutting a series of slits 40 into one edge to form the series of tabs 38. In all, nine tabs 38 are shown formed by eight slits 40 according to one example. Slits 40 extend from the edge of the separator sheet to the dotted fold line 42 which forms the fold axis between the side wall and closed bottom surface. Tabs 38 each have a length $L_t$ that is at least equal to one-half the inside diameter D of the cathode 22, and preferably is slightly greater than one-half the cathode inside diameter D by approximately 1/16 of an inch, such that there is a small amount of overlap at the center, but not an excessive amount such that volume efficiency is maintained. Each of tabs 38 has a width $W_t$ equal to approximately $$\frac{2}{N} \times \pi \times D,$$

where N equals the number of tabs for a 720 degree rotation. The cylindrical side wall 36 of separator 24 has a height $H_s$ that extends from the bottom of can 12 to a location above the electrodes, and is preferably in contact with the nylon seal 32. The ends of side wall 36 have narrow sections 44 and 46 that are provided to overlap beyond the 720 degree rotation. The total overlap width of sections 44 and 46 combined is preferably equal to approximately D/8 for cells formed with cathode impact molding, and is equal to approximately D/16 for cells formed with cathode ring molding.

Figure 3:
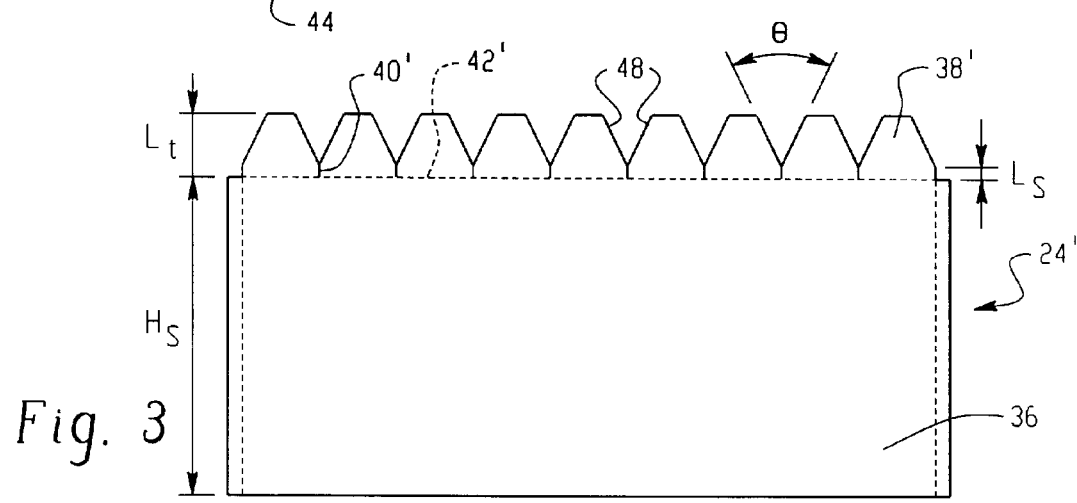
FIG. 3 is a perspective view of a sheet of separator material formed with tabs for forming a cup-shaped separator according to another embodiment of the present invention.

Referring to FIG. 3, a separator 24' is illustrated having tabs 38' according to another embodiment. Each of tabs 38' have angled cutouts 48 to form a trapezoidal tab with slits 40' between adjacent tabs 38'. The cutouts 48 are each preferably provided at an angle of approximately thirty degrees to provide a V-shaped groove between adjacent tabs 38' with an angle of approximately sixty degrees. A small slit 40' is further formed between adjacent tabs 38', preferably having a length $L_s$ equal to approximately D/8. The tabs 38' with cutouts 48 advantageously reduce the amount of separator material that overlaps at the bottom closed end of the separator, which reduces volume consumption by the separator 24' and leaves more volume for other cell materials. While rectangular and trapezoidal tabs 38 and 38', respectively, are shown and described herein, it should be appreciated that other shapes may be employed such as pie-shaped or moon-shaped tabs.

Figure 4:
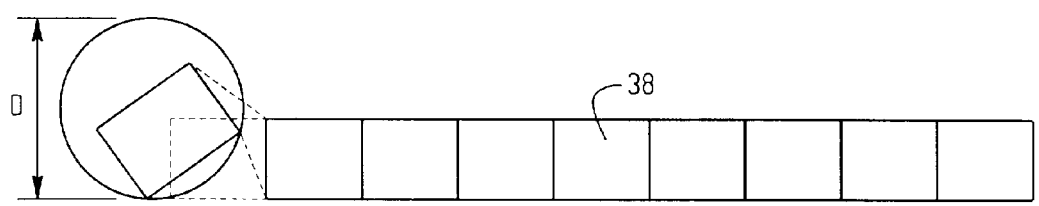
FIG. 4 is a schematic view of the tabs of the separator of FIG. 2 illustrating folding of the first tab during assembly.
Figure 5:
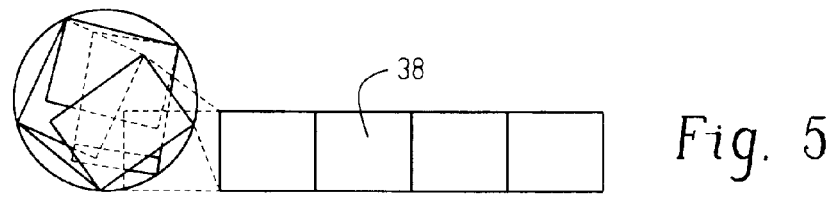
FIG. 5 is a schematic view of the tabs of the separator of FIG. 2 illustrating folding of the fifth tab during assembly.
Figure 6:
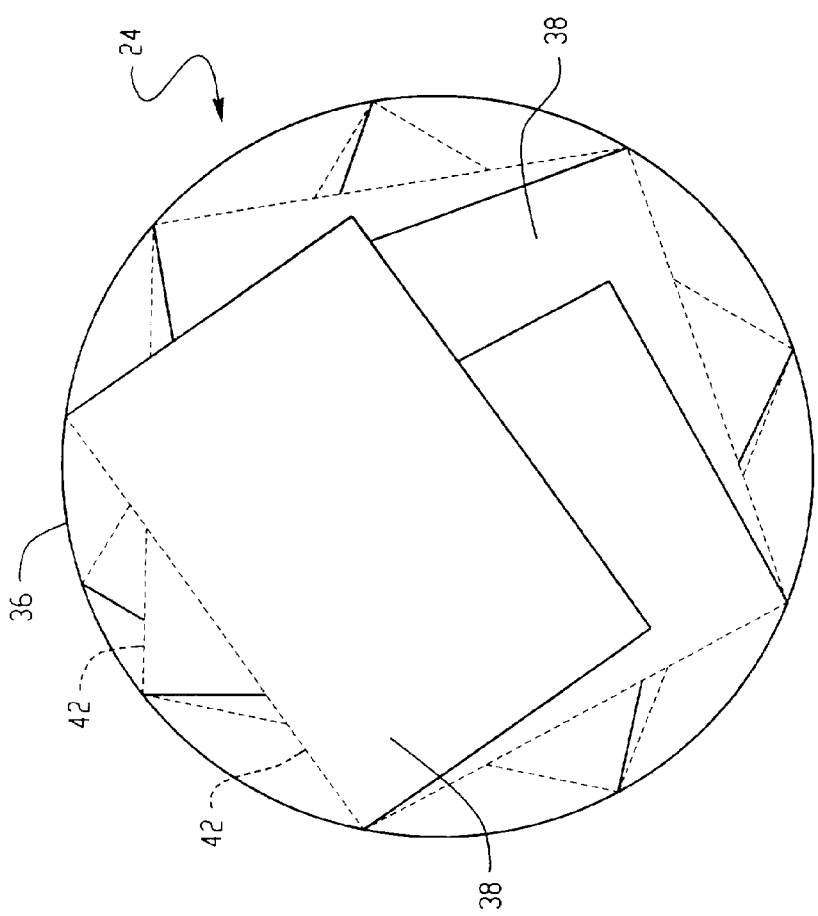
FIG. 6 is a bottom view of the separator of FIG. 2 shown fully assembled.

Referring to FIGS. 4 through 6, the folding of the tabs 38 of the separator 24 is shown at the beginning, middle, and end of the formation of the bottom closed end. In FIG. 4, the first tab is rotated by an angle of 80 degrees from a starting position and folded radially inward. The second tab is then rotated another 80 degrees, to an angular position of 160 degrees, and folded radially inward and partially overlapping the first tab. The third tab is likewise rotated 80 degrees, to an angular position of 240 degrees relative to the starting position, and folded radially inward and partially overlapping the second tab. The fourth tab is rotated 80 degrees, to an angular position of 320 degrees, and folded radially inward and partially overlapping the third tab. The fifth tab is rotated 80 degrees, to an angular position of 400 degrees, and is folded radially inward and partially overlapping the fourth tab, as shown in FIG. 5. Accordingly, the fifth tab completes the first 360 degree wrap of the separator material and begins the second 360 degree wrap, offset by 40 degrees relative to the first wrap. By offsetting the angular positions of the tabs for the first and second wraps, the separator material forms a closed bottom end with the second wrap covering any openings that may exist after the first wrap is completed. The remaining tabs, i.e., the sixth, seventh, eight, and ninth tabs, are each sequentially rotated in order by 80 degrees to angular positions of 480 degrees, 560 degrees, 640 degrees, and 720 degrees, respectively, and are folded radially inward such as to at least partially overlap the previously folded tab. A view of the closed bottom end of separator 24 is shown in FIG. 6 which shows the individual tabs 38 folded to overlap each other. Each tab 38 is rotated and folded inward at the ends of slits 40 such that there are no openings present in the bottom end.

Figure 7:
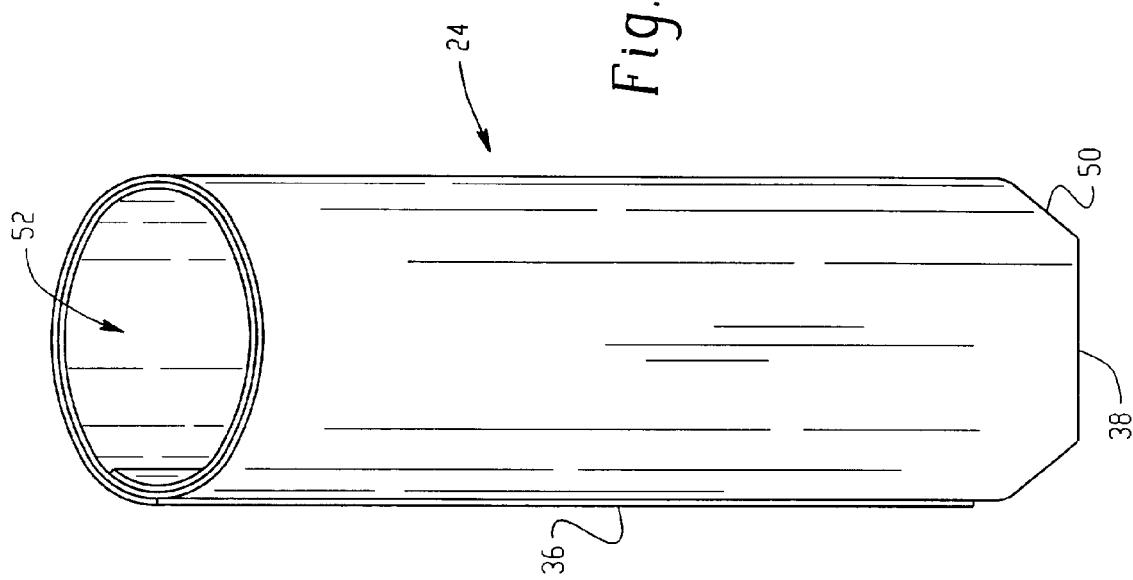
FIG. 7 is an elevational view of the fully assembled separator ready for insertion in an electrochemical cell.

Referring to FIG. 7, the completed separator 24 is shown ready for insertion into the cathode of an electrochemical cell. The separator 24 has cylindrical vertical side wall 36, horizontal closed bottom end formed by tabs 38, and angled section 50 transitioning between the side wall 36 and bottom end. The transition section 50 is a rounded surface that transitions from the cylindrical vertical wall 36 to the folded crease at the base of each tab 38. The greater the number of tabs 38, the less the transition section 50 will generally be. Once the separator 24 is inserted in the cathode 22 and the anode 26 is injected into the separator 22, the separator 22 will tend to conform to the shape of the hollow in cathode 22.

While the separator 24 of the present invention is shown and described in connection with a double wound sheet of material having a cylindrical side wall and tabs folded about a 720 degree rotation, it should be appreciated that separator 24 may be formed from a single wound sheet of material with tabs 38 folded over a 360 degree angle of rotation, and preferably with a slightly greater rotation to provide overlap. In addition, it should also be appreciated that two or more separators 24 may be formed and disposed one inside the other to form multiple layers. For example, a first separator sheet could be rolled about a 360 degree rotation to form an outer separator layer, and a second sheet can be rolled about a 360 degree rotation to form an inner layer, wherein the inner layer is disposed in the outer layer to form a double-layered separator 24.

Figure 8:
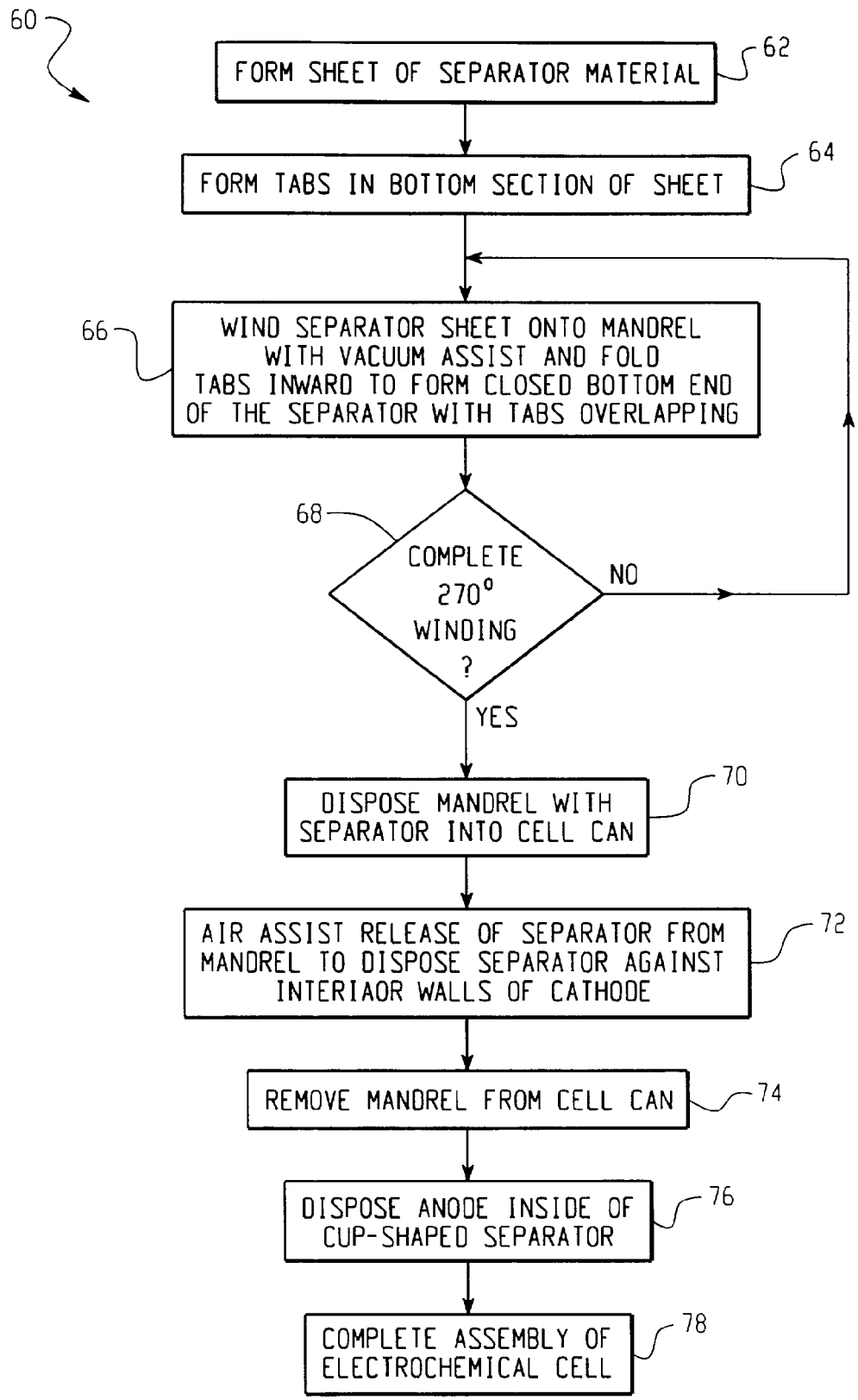
FIG. 8 is a flow diagram illustrating assembly of the separator and insertion into an electrochemical cell.
Figure 11:
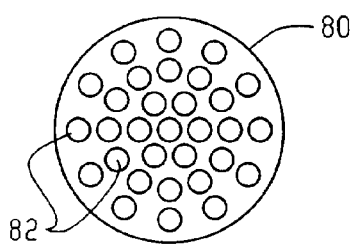
FIG. 11 is a perspective view of the bottom end of the mandrel shown in FIG. 10.
Figure 9:
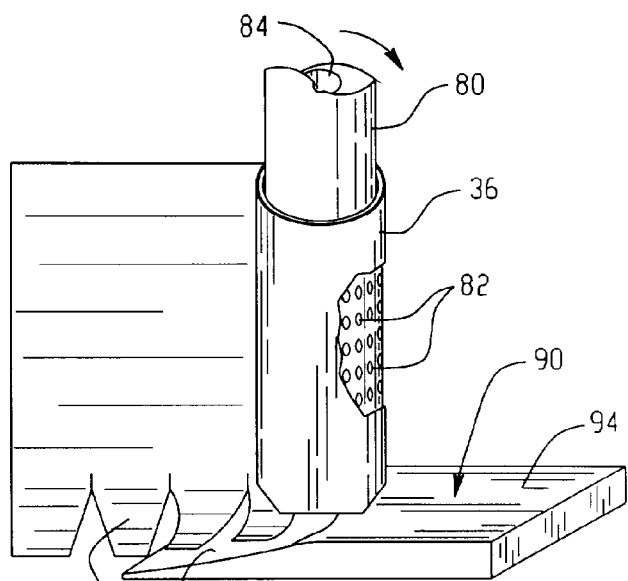
FIG. 9 is a perspective view of a partially assembled separator wound on a mandrel during the separator assembly process.
Figure 10:
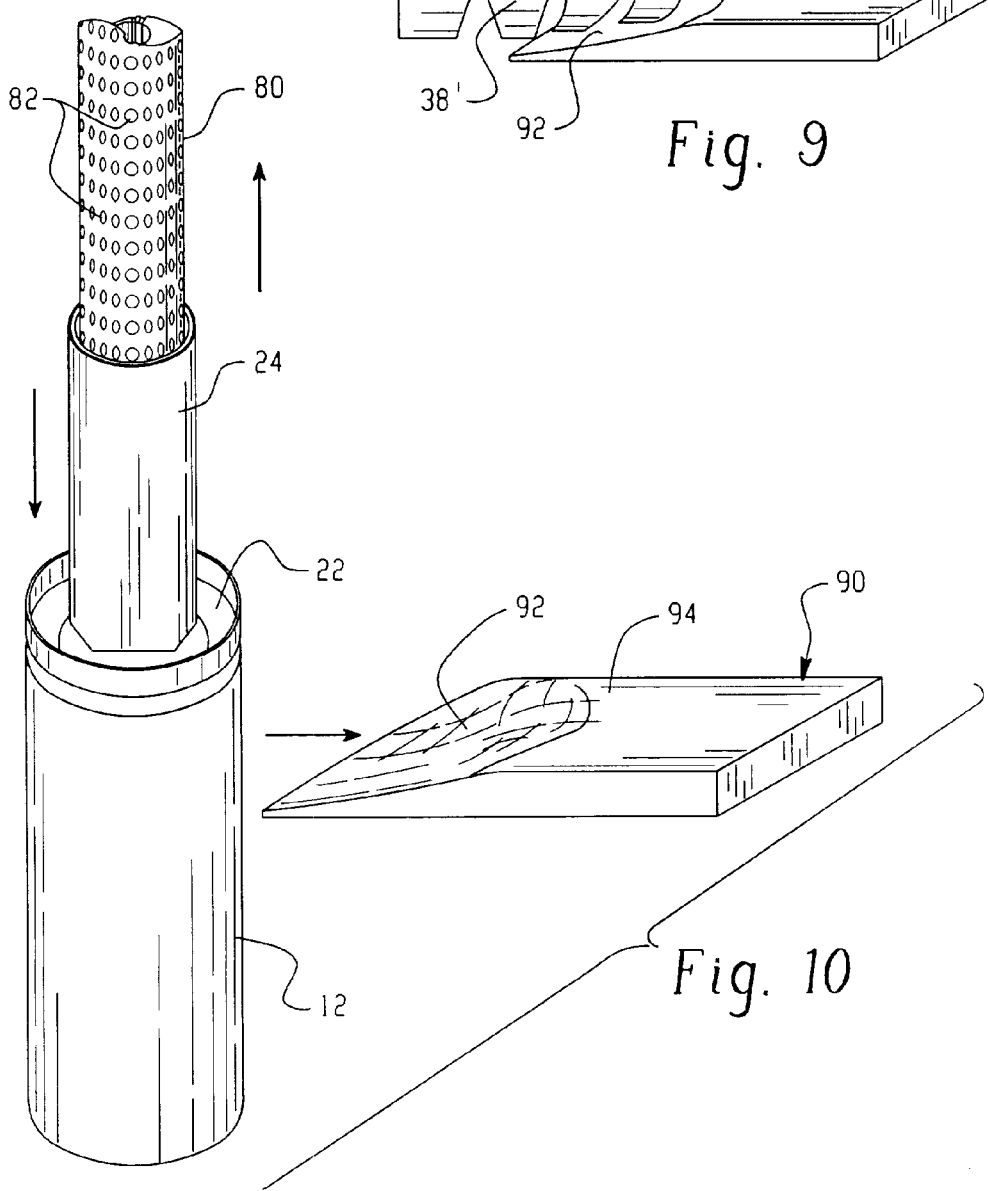
FIG. 10 is a perspective view of the separator being inserted into an electrochemical cell during cell assembly.

Referring to FIGS. 8 through 10, a method of forming the separator 24 and its assembly in an electrochemical cell is illustrated therein. With particular reference to FIG. 8, a methodology 60 is shown for forming the separator 24 and assembling the separator 24 during an electrochemical cell assembly. Methodology 60 includes step 62 of forming a sheet of separator material, and step 64 of forming tabs in the bottom section of the sheet. In step 66, the separator sheet is wound onto a mandrel with vacuum assistance and the tabs are folded radially inward to form the closed bottom end of the separator with the tabs overlapping. Referring also to FIG. 9, the sheet of separator material is shown partially wound on a mandrel 80 positioned above a base plate 90 having a contoured surface 92 which transitions to a level top surface 94. The mandrel 80 has a hollow extending centrally therein and a plurality of openings 82 formed in the cylindrical side wall of mandrel 80, as well in the bottom end as shown in FIG. 11. During winding of the separator material, air is pumped out of the hollow 84 of mandrel 80 such as to create a vacuum at opening 82 for holding the sheet of separator material against the mandrel 80. At the same time, the mandrel 80 is rotated to wind the paper thereon to form the cylindrical wall 36 and at the same time cause tabs 38' to be folded radially inward and form the closed bottom end by way of the contoured surface 92 and flat surface 94.

Referring back to FIG. 8, methodology 60 proceeds to step 68 to check for whether a complete 720 degree winding of the separator material has been obtained and, if so, proceeds to step 70. Methodology 60 will repeat steps 66 and 68 until a complete 720 degree winding has been obtained. In step 70, the mandrel 80 with the separator 24 wound thereon is disposed into the cell can 12 in the cylindrical cavity or hollow formed in cathode 22, as is shown in FIG. 10. In doing so, base plate 90 is removed relative to mandrel 80 to allow mandrel 80 to move vertically downward into can 12. Once mandrel 80 is fully disposed in can 12, the air flow through hollow 84 of mandrel 80 is reversed so that openings 82 change from a vacuum to a positive outward air flow so as to air assist release of the separator 24 from mandrel 80. The air assisted release allows for disposal of the separator 24 against the interior walls of the cathode 22 as provided in step 72. In step 74, the mandrel 80 is then removed from the cell can 12. Thereafter, methodology 60 includes the steps of disposing the anode inside of the cup-shaped separator as shown in step 76. Assembly of the electrochemical cell is then completed in step 78, which includes sealing closed the open end of the container.

Accordingly, the present invention provides for a separator 24 for separating the positive and negative electrodes 22 and 26 and makes efficient use of the separator material. In addition, the separator 24 is formed and assembled into an electrochemical cell during the cell assembly without requiring glue or other adhesives. However, adhesives and/or sealants could be applied to the separator 24, particularly on the bottom surface.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A separator for use in an electrochemical cell for separating a positive electrode from a negative electrode, said separator comprising:
    a sheet of separator material having a bottom section and a side wall section, said sheet having a plurality of tabs formed in said bottom section, said sheet being rolled and said plurality of tabs folded to form a closed bottom surface of said separator.

2. The separator as defined in claim 1, wherein said tabs overlap.

3. The separator as defined in claim 1, wherein said sheet is rolled through an angular rotation of approximately 720 degrees.

4. The separator as defined in claim 3, wherein said plurality of tabs is an odd number of tabs.

5. The separator as defined in claim 4, wherein said number of tabs comprises in the range of 9 to 17 tabs.

6. The separator as defined in claim 1, wherein said plurality of tabs formed in the bottom section of said sheet are rectangular.

7. The separator as defined in claim 1, wherein said plurality of tabs formed in the bottom section of said sheet are trapezoidal.

8. The separator as defined in claim 3, wherein said sheet is rolled through a first and second complete rotation, wherein tabs rolled in said second rotation are offset from said tabs folded in said first rotation.

9. The separator as defined in claim 1, wherein said sheet is rolled into a substantially cylindrical shape having a closed bottom end to form a cup-shaped separator.

10. An electrochemical cell comprising:
    a container having a bottom end and a top end and upstanding walls disposed therebetween;
    a positive electrode disposed in said container;
    a negative electrode disposed in said container; and
    a separator disposed between said positive electrode and said negative electrode, said separator having upstanding walls and a closed bottom end, wherein said bottom end includes a plurality of tabs, and wherein said tabs are individually folded inward to form said closed bottom end of said separator.

11. The electrochemical cell as defined in claim 10, wherein said separator is made of a sheet that is rolled through an angular rotation of approximately 720 degrees.

12. The electrochemical cell as defined in claim 11, wherein said plurality of tabs is an odd number of tabs.

13. The electrochemical cell as defined in claim 12, wherein said number of tabs comprises in the range of 9 to 17 tabs.

14. The electrochemical cell as defined in claim 10, wherein said tabs overlap.

15. The electrochemical cell as defined in claim 10, wherein said plurality of tabs are formed by slits in the bottom end section of said sheet of separator material.

16. The electrochemical cell as defined in claim 15, wherein said plurality of tabs are rectangular.

17. The electrochemical cell as defined in claim 10, wherein said plurality of tabs are trapezoidal.

18. A method of forming a separator for use in an electrochemical cell for separating a positive electrode from a negative electrode, said method comprising the steps of:
    providing a sheet of separator material;
    forming a plurality of tabs along an edge of said sheet of separator material;
    rolling said sheet of separator material to form a side wall; and
    folding said tabs radially inward so as to form a closed bottom end, wherein said plurality of tabs substantially close the bottom end of said separator.

19. The method as defined in claim 18, wherein said step of rolling said sheet of separator material comprises at least rolling said sheet through an angular rotation of approximately 720 degrees.

20. The method as defined in claim 19, wherein said step of forming a plurality of tabs includes forming an odd number of tabs.

21. The method as defined in claim 20, wherein said step of forming a plurality of tabs further includes forming in the range of 9 to 17 tabs.

22. The method as defined in claim 18, wherein said step of rolling said sheet of separator material comprises rolling said sheet of separator material into a cylindrical shape.

23. The method as defined in claim 18, wherein said step of folding said tabs includes folding some of said tabs so as to overlap one or more other tabs.

24. The method as defined in claim 18 further comprising the step of cutting a plurality of slits in said sheet of said separator material to form said plurality of tabs.

25. The method as defined in claim 18, wherein said step of forming a plurality of tabs comprises forming rectangular tabs.

26. The method as defined in claim 18, wherein said step of forming a plurality of tabs comprises forming trapezoidal tabs.

27. The method as defined in claim 18 further comprising the steps of disposing said separator in a cell container between a positive electrode and a negative electrode.

28. A method of assembling an electrochemical cell, said method comprising the steps of:
    providing a container having a bottom end and a top end and upstanding walls disposed therebetween;
    disposing a positive electrode in said container;
    disposing a negative electrode in said container;
    providing a sheet of separator material;
    forming a plurality of tabs along an edge of said sheet of separator material;
    rolling said sheet of separator material to form a side wall;
    folding said plurality of tabs radially inward so as to form a substantially closed bottom end of said separator; and
    disposing said separator between said positive electrode and said negative electrode.

29. The method as defined in claim 28, wherein said step of rolling said sheet of separator material comprises at least rolling said sheet through an angular rotation of approximately 720 degrees.

30. The method as defined in claim 29, wherein said step of forming a plurality of tabs comprises forming an odd number of tabs.

31. The method as defined in claim 30, wherein said step of forming a plurality of tabs further comprises forming a number of tabs in the range of 9 to 17.

32. The method as defined in claim 28, wherein said step of forming a plurality of tabs comprises forming rectangular tabs.

33. The method as defined in claim 28, wherein said step of forming a plurality of tabs comprises forming trapezoidal tabs.

34. The method as defined in claim 28, wherein said step of rolling said sheet of separator material includes rolling said sheet of separator material into a cylindrical shape.

35. The method as defined in claim 28, wherein said step of folding said plurality of tabs further includes folding said tabs so that some of said tabs overlap at least one or more of other tabs.

* * * * *